US009070120B2

(12) United States Patent
Efrati et al.

(10) Patent No.: US 9,070,120 B2
(45) Date of Patent: Jun. 30, 2015

(54) IDENTIFYING AND DISPLAYING A SET OF HIGH PRIORITY CONTACTS ON A DISPLAY DEVICE (71) Applicant: VONAGE NETWORK LLC, Holmdel, NJ (US)

(72) Inventors: Tzahi Efrati, Hoboken, NJ (US); Ido Mintz, Burgata (IL)

(73) Assignee: VONAGE NETWORK LLC, Holmdel, NJ (US)

( * ) Notice: Subject to any disclaimer, the term of this patent is extended or adjusted under 35 U.S.C. 154(b) by 234 days.

(21) Appl. No.: 13/715,365

(22) Filed: Dec. 14, 2012

(65) Prior Publication Data
US 2014/0173515 A1    Jun. 19, 2014

(51) Int. Cl.
G06Q 10/10    (2012.01)

(52) U.S. Cl.
CPC .................................. G06Q 10/109 (2013.01)

(58) Field of Classification Search
CPC ... G06F 3/0482; G06F 9/4446; G06F 3/0481; H04M 1/72583; H04M 1/72586
USPC .......................................................... 715/811
See application file for complete search history.

(56) References Cited

U.S. PATENT DOCUMENTS

| 7,580,363 | B2 * | 8/2009 | Sorvari et al. ................. 370/252 |
| 8,091,045 | B2 * | 1/2012 | Christie et al. ................ 715/863 |
| 8,136,125 | B2 * | 3/2012 | Beadle et al. ................. 719/318 |
| 8,346,881 | B1 * | 1/2013 | Cohen ........................... 709/206 |
| 8,661,002 | B2 * | 2/2014 | Smith et al. .................... 707/694 |
| 8,775,404 | B1 * | 7/2014 | Peden et al. ................... 707/709 |
| 8,792,437 | B2 * | 7/2014 | Dhere ............................ 370/329 |
| 8,855,723 | B2 * | 10/2014 | Lynch, III ..................... 455/567 |
| 2002/0151334 | A1 * | 10/2002 | Sharma ......................... 455/566 |
| 2009/0037413 | A1 * | 2/2009 | Castell et al. ..................... 707/7 |
| 2009/0088168 | A1 * | 4/2009 | Varanasi ....................... 455/445 |
| 2009/0167553 | A1 * | 7/2009 | Hong et al. .............. 340/825.29 |
| 2011/0157029 | A1 * | 6/2011 | Tseng ............................ 345/173 |
| 2011/0231407 | A1 | 9/2011 | Gupta et al. |
| 2012/0271822 | A1 | 10/2012 | Schwendimann et al. |
| 2014/0081914 | A1 * | 3/2014 | Smith et al. .................... 707/614 |
| 2014/0095964 | A1 * | 4/2014 | Mayblum et al. ............. 715/201 |
| 2014/0096032 | A1 * | 4/2014 | Mayblum et al. ............. 715/752 |
| 2014/0173515 | A1 * | 6/2014 | Efrati et al. ................... 715/811 |
| 2014/0214895 | A1 * | 7/2014 | Higgins et al. ................ 707/770 |

OTHER PUBLICATIONS

International Search Report and Written Opinion mailed Aug. 21, 2014 for Application PCT/US2013/74619.

* cited by examiner

Primary Examiner — David Phantana Angkool
(74) Attorney, Agent, or Firm — Moser Taboada; Joseph Pagnotta (57) ABSTRACT A method and apparatus for identifying and displaying a set of high priority contacts on a display device associated with an end user device. In some embodiments, the method includes retrieving high priority contact list configuration settings that include one or more criteria for identifying a set of high priority contacts from a contact list having a plurality of contacts, determining whether information associated with one or more of the plurality of contacts meets the one or more criteria retrieved, identifying the one or more of the plurality of contacts that meet the one or more criteria as a set of one or more high priority contacts, and displaying the set of one or more high priority contacts in a high priority contact list on the display device.

19 Claims, 5 Drawing Sheets

IDENTIFYING AND DISPLAYING A SET OF HIGH PRIORITY CONTACTS ON A DISPLAY DEVICE

BACKGROUND OF THE INVENTION

1. Field of the invention

Embodiments consistent with the present invention generally relate to methods and apparatus for identifying and displaying a set of high priority contacts on a display device as a subset of a full contact list based on various criteria/trigger events.

2. Description of the Related Art

An address book function may include numerous contacts in the form of contact lists. A subset of contacts in a contact list may have a higher priority to the user based on the date or time or in different situations. However, conventional contact lists do not contextually differentiate between high priority contacts and regular contacts.

Thus there is a need for a method and apparatus to provide a better way of identifying and displaying a list of high priority contacts in a contact list.

SUMMARY OF THE INVENTION

A method and apparatus for identifying and displaying a set of high priority contacts on a display device associated with an end user device. In some embodiments, the method includes retrieving high priority contact list configuration settings that include one or more criteria for identifying a set of high priority contacts from a contact list having a plurality of contacts, determining whether information associated with one or more of the plurality of contacts meets the one or more criteria retrieved, identifying the one or more of the plurality of contacts that meet the one or more criteria as a set of one or more high priority contacts, and displaying the set of one or more high priority contacts in a high priority contact list on the display device.

In some embodiments, an apparatus for identifying and displaying a set of high priority contacts on a display device associated with an end user device includes at least one processor, at least one input device, and at least one storage device storing processor executable instructions which, when executed by the at least one processor, perform a method including retrieving high priority contact list configuration settings that include one or more criteria for identifying a set of high priority contacts from a contact list having a plurality of contacts, determining whether information associated with one or more of the plurality of contacts meets the one or more criteria retrieved, identifying the one or more of the plurality of contacts that meet the one or more criteria as a set of one or more high priority contacts, and displaying the set of one or more high priority contacts in a high priority contact list on the display device.

In some embodiments, a non-transient computer readable medium for storing computer instructions that, when executed by at least one processor causes the at least one processor to performs a method including retrieving high priority contact list configuration settings that include one or more criteria for identifying a set of high priority contacts from a contact list having a plurality of contacts, determining whether information associated with one or more of the plurality of contacts meets the one or more criteria retrieved, identifying the one or more of the plurality of contacts that meet the one or more criteria as a set of one or more high priority contacts, and displaying the set of one or more high priority contacts in a high priority contact list on the display device.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a method and apparatus for improving upon standard contact lists by providing additional flexibility in the way the high priority contacts are evaluated and displayed on a display device. The "hot list" of high priority contacts is dynamically updated based on a number of parameters, some of which would be user selectable while others are preset based on calling patterns and caller behavior.

Various embodiments of an apparatus and method for identifying and displaying a set of high priority contacts on a display device are provided below. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
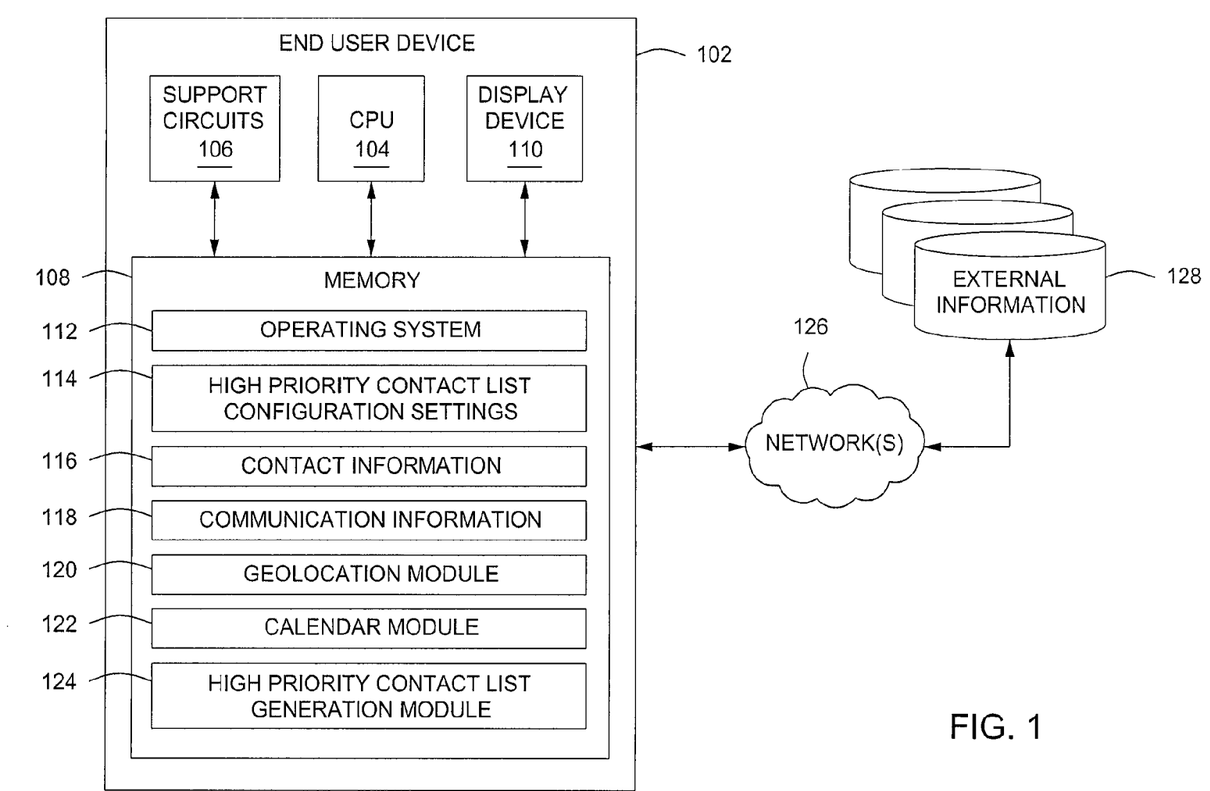
FIG. 1 depicts a block diagram of a system for identifying and displaying a set of high priority contacts on a display device, accordance with embodiments consistent with the present application.

FIG. 1 depicts a block diagram of end user device 102 for identifying and displaying a set of high priority contacts on a display device 110 associated with the end user device 102, according to one or more embodiments. The end user device 102 comprises a Central Processing Unit (CPU) 104, support circuits 106, a memory 108, and the display device 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 106 comprises at least one of Read Only Memory (ROM), Random Access Memory (RAM), disk drive storage, optical storage, removable storage and/or the like. In some embodiments, the display device 110 may be a touch screen able to accept input from a user's finger or input from a stylus. In some embodiments, the memory 108 comprises an operating system 112, high priority contact list configuration settings 114, contact information 116, communication information 118, geolocation information 120 and calendar information 122.

The operating system (OS) 112 generally manages various computer resources (e.g., network resources, file processors, and/or the like). The operating system 110 is configured to execute operations on one or more hardware and/or software modules, such as Network Interface Cards (NICs), hard disks, virtualization layers, firewalls and/or the like. Examples of the operating system 112 may include, but are not limited to, Linux, Mac OSX, BSD, Unix, Microsoft Windows, and the like.

Figure 2:
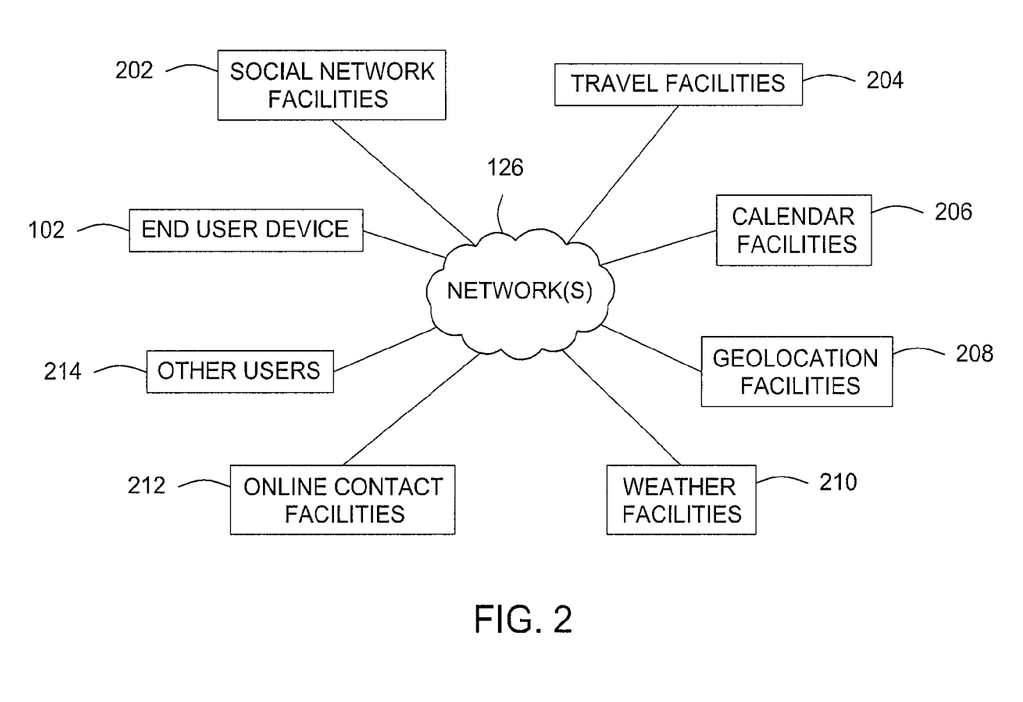
FIG. 2 depicts an environment in which, or with which, exemplary embodiments consistent with the present invention may operate.

A high priority contact list generation module 124 may also be stored in memory 108. High priority contact list generation operations 124 may use high priority contact list configuration settings 114, contact information 116, communication information 118 (e.g., call logs of previous calls made/received, and the like), geolocation information 120, and calendar information 122 to create a high priority contact list as will be described below in detail. In some embodiments, some or all of the information and modules described above may be stored remotely on a remote server (not shown) and retrieved from the remote server by the end user device 102 when needed. In some embodiments, high priority contact list generation module 124 may also receive external information 128 from external services/devices via network(s) 126 to identify high priority contacts. For example, as shown in FIG. 2, external information 128 may be provided by social network facilities 202, travel/transportation facilities 204, calendar facilities 206, geolocation facilities 208, weather facilities 210, online contact facilities 212, other user devices 214, and the like.

The network 126 comprises a communication system that connects computers by wire, cable, fiber optic and/or wireless link facilitated by various types of well-known network elements, such as hubs, switches, routers, and the like. The network 160 may employ various well-known protocols to communicate information amongst the network resources. For example, the network 160 may be a part of the Internet or Intranet using various communications infrastructure, such as Ethernet, Wi-Fi, Wi-Max, General Packet Radio Service (GPRS), and the like.

Figure 3:
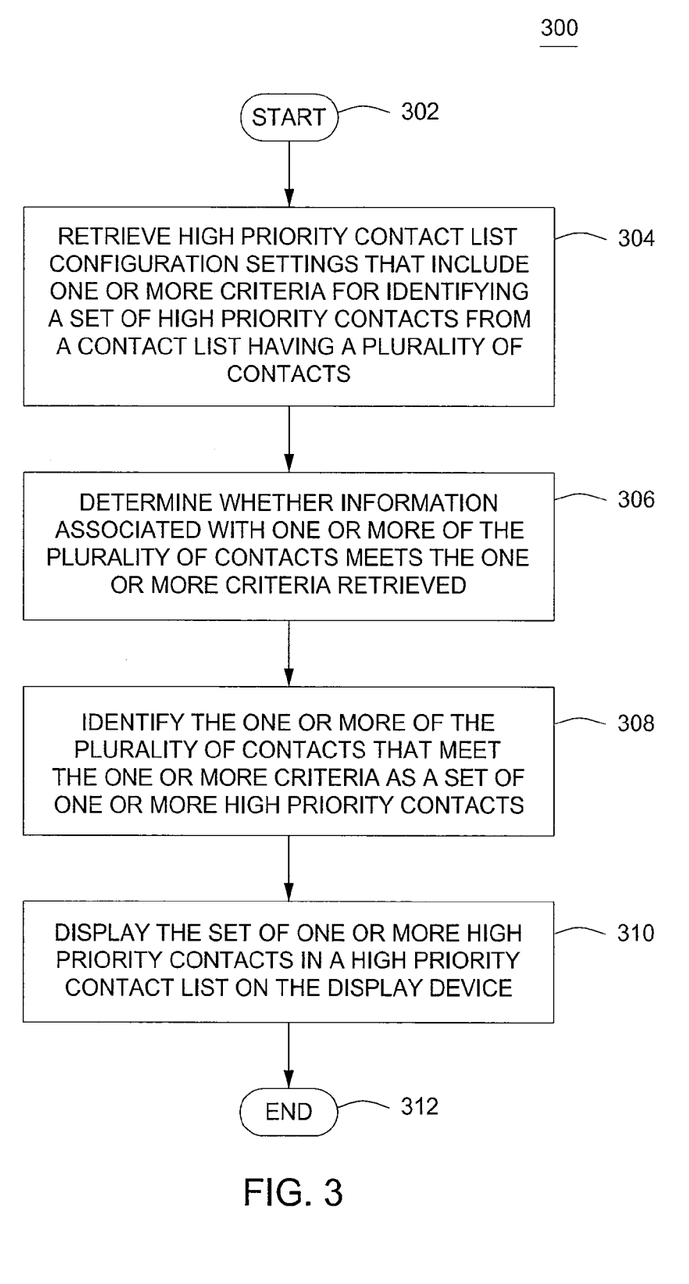
FIG. 3 depicts a flow diagram of a method for identifying and displaying a set of high priority contacts on a display device associated with an end user device, according to one or more embodiments of the invention.

FIG. 3 depicts a flow diagram of a method 300 for identifying and displaying a set of high priority contacts on a display device, according to one or more embodiments of the invention. The method 300 starts at 302, and generally proceeds to 304.

At 304, high priority contact list configuration settings are retrieved. The high priority contact list configuration settings may include one or more criteria for identifying a set of high priority contacts from a contact list having a plurality of contacts. The high priority contact list configuration settings (and associated criteria) may be retrieved from memory 108 on end user device 102, or may be retrieved from a remote server. In some embodiments, the criteria or rules for identifying a high priority contact may be set by the user. The user may also include a reason in the form of descriptive text to display information as to why the contact was identified as a high priority contact.

At 306, it is determined whether information associated with one or more of the plurality of contacts meets the one or more criteria retrieved. The determination of whether information associated with one or more of the plurality of contacts meets the one or more criteria retrieved may be performed on end user device 102, or may be determined on a remote server and pushed to the end user device 102 (e.g., cloud based computing environment).

At 308, the one or more of the plurality of contacts that meet the one or more criteria are identified as a set of one or more high priority contacts. In some embodiments, the identification of one or more of the plurality of contacts as a set of one or more high priority contacts may be performed on end user device 102, or may be determined on a remote server and pushed to the end user device 102 (e.g., cloud based computing environment).

In some embodiments, a contact may be identified as a high priority contact based on a calling frequency between the end user device and one or more devices associated with the contact. In some embodiments, if a calling frequency between the end user device and the contact is greater than or equal to a predetermined calling frequency threshold, the contact will be identified as a high priority contact. For example, if the end user calls (and/or texts, emails, etc.) a contact X times, that contact would be identified as a high priority contact if the predetermined calling frequency threshold was set at X. In some embodiments, a configurable time period Y may also be stored and associated with the predetermined calling frequency threshold (e.g., calling a contact X times within Y hours). In other embodiments, the top Z contacts called (and/or texted, emailed, etc.) would be identified as high priority contacts, where Z may be a configurable value. In some embodiments, all values discussed above, may have default settings and/or may be configurable by the user. In other embodiments, some settings may be fixed and/or have maximum/minimum values.

In some embodiments, the at least one contact is identified as a high priority contact based on a calendar date associated with the at least one contact. For example, if the dates for a contact's birthday, anniversary, child's birthday, etc. are stored as information associated with the contact, the contact would be identified as a high priority contact if one of those dates falls within X hours/days/weeks/months of the current date. In some embodiments, the priority of a contact may be increased within the high priority contact list (e.g., placed higher in the list) as certain events approach (e.g., conference call, b-day, and the like). The value for X may be a default value or configurable by the user, and may be any value greater than or equal to 0.

In some embodiments, a contact may be identified as a high priority contact based on a calling pattern between the end user device and one or more devices associated with the contact. In some embodiments, a configurable number of similar previous communications may define a calling pattern between the end user device and one or more devices associated with the contact. The configurable number may be a default value and/or configurable by the user. For example, if an end user calls a contact at about 3:00 PM each day for X days, the contact would be identified as a high priority contact if X was the criteria set in the high priority contact list configuration settings for defining this type of calling pattern. In some embodiments, the contact would be displayed in the high priority contact list at around the time the end user usually calls the contact (e.g., 3:00 PM +/− a configurable time window). In some embodiments, the calling pattern may include an end user contacting a contact from a specific location a configurable number of times. For example, if the last X times an end user was at Dulles International Airport, the end user called contact A, contact A would be identified as a high priority contact if X was the criteria set in the high priority contact list configuration settings for defining this type of geolocation based calling pattern. In some embodiments, the contact would be displayed in the high priority contact list only when the end user is at the location that triggered the high priority contact. For example, in the above, contact A would be included in the end user's high priority contact list only when the end user is located at Dulles International Airport. In some embodiments, the location of the contact may be used for identifying a calling pattern. The geolocation information may be based on geolocation facilities 208 such as global positioning satellite information, mobile phone network information (e.g., cell towers, mobile phone access points, etc.), or other geolocation identification means.

In some embodiments, the at least one contact is identified as a high priority contact based on social network information associated with one or more one or more of the plurality of contacts. The social network information associated with one or more one or more of the plurality of contacts may be stored locally on device 102, or received from social network facilities 202.

In some embodiments, the at least one contact is identified as a high priority contact based on calendar information associated with one or more one or more of the plurality of contacts. The calendar information associated with one or more one or more of the plurality of contacts may be stored locally on device 102, or received from external calendar facilities 206. The calendar information received may include an upcoming scheduled call or meeting with the at least one contact.

In some of the embodiments described above, the high priority contact list is dynamically updated based on at least one of (a) calling activity, (b) a change to contact information associated with at least one of the plurality of contacts, (c) addition of a contact to the contact list, (d) removal of a contact to the contact list, (e) the passage of time, or (f) the geolocation of the user's device or a device associated with the contact.

In some embodiments, the user may be prompted for feedback regarding the one or more high priority contacts identified. That is, once a contact is identified as a high priority contact, it may be presented to the user, and the user can provide feedback as to whether to add them as a high priority contact. In some embodiments, the user feedback may be used to "teach" the system as to the types of high priority contact list criteria the user deems important.

After one or more of the plurality of contacts are identified as a set of one or more high priority contacts (e.g., by either the end user device 102, or by a remote cloud-based server and pushed to the end user device 102), the set of one or more high priority contacts is displayed in a high priority contact list in visible area 102 on the display device at 310. In some embodiments, additional information associated with the criteria/rules for identifying a high priority contact may also be displayed. For example, a user may also include a reason in the form of descriptive text for a high priority contact criteria/rule (e.g., "Mom's Birthday"). That information would be displayed proximate to the high priority contact in the high priority contact list. The method 300 then ends at step 312.

Figure 4:
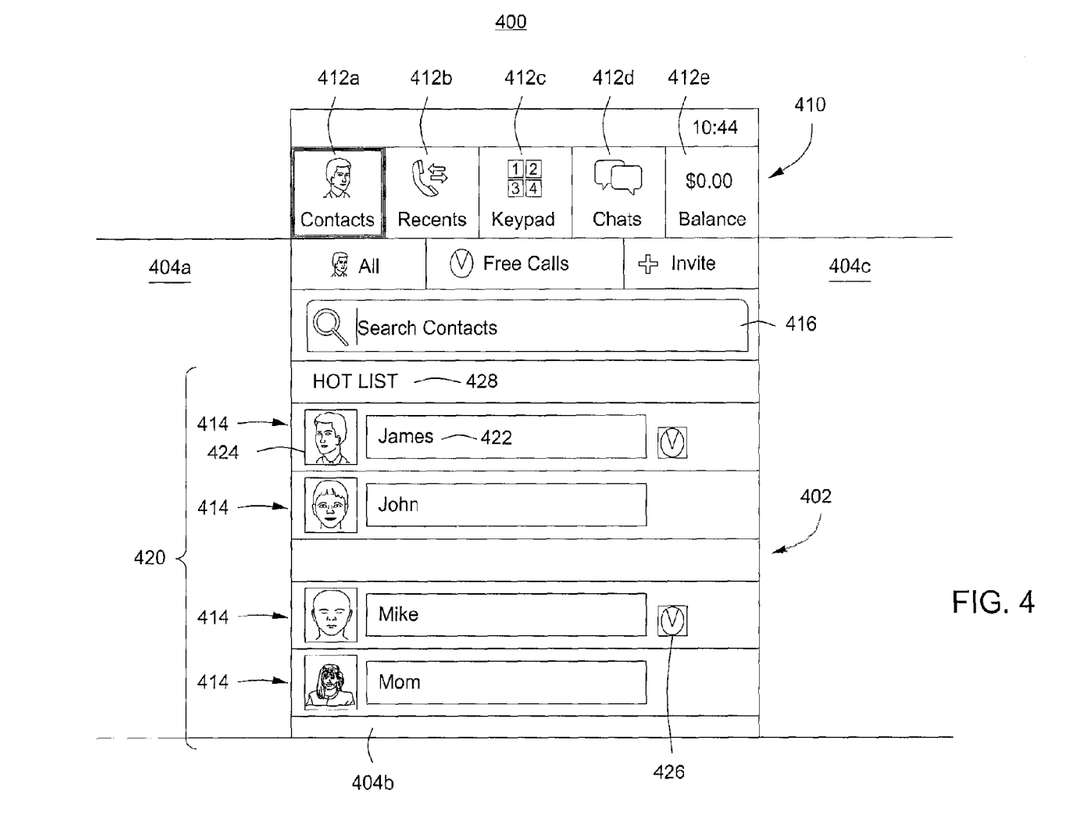
FIG. 4 depicts an exemplary user interface including a high priority contact list, according to one or more embodiments of the invention.

FIG. 4 depicts an exemplary user interface 400 in accordance with embodiments consistent with the present application.

The user interface 400 may include a defined viewable area 402 which can be scrolled. The scrollable viewable area 402 may display a plurality of pages 404a-404c, including various functional or informational pages, to a user.

In some embodiments, functional pages 404a-404c may include user selectable objects 414 to facilitate the desired functionality. For example, page 404b may include contact information and tools that consist of a plurality of selectable objects 414, and a search object 416. According to some embodiments, functional pages 404a-404c may include one or more contact information pages, a dialer to facilitate the dialing of phone numbers, a chat page for interacting with another person via chat, an account balance page for checking account balances and adding additional funds to a user's account, and the like. Although only three pages 404a-c are depicted, more or less pages may be used.

According to some embodiments, at least some of the plurality of pages 404a-404c may include static or dynamic information for display to the user. For example, in some embodiments, at least some of the plurality of pages 404a-404c may display information such as recently called phone numbers or contacts.

A user may scroll between the plurality of pages 404a-404c using a number of input methods. In some embodiments consistent with the present application, a user may swipe a touch-sensitive screen to scroll from page to page in user interface 400. In other embodiments, a user may use a mouse or keyboard input to select a specific page. User interface 400 may also include a menu area 410 which may include a plurality of selectable menu objects 412a-412e. Each menu object 412a-412e may take a user to a specific page when selected. In some embodiments, menu area 410 may be fixed such that it does not scroll as a user scrolls between pages 404*a*-404*c*. In other embodiments, menu area 410 may be separately scrollable such that it can be scrolled to display additional selectable menu objects, but scrolls independently from pages 404*a*-404*c*.

FIG. 4 includes example embodiments of a high priority contact list 420 displayed on a contact information page 404*b* in viewable area 402. In some embodiments, the high priority contact list 420 may be displayed in its own separate page. In other embodiments, the high priority contact list 420 may be displayed in a first group of contacts above a standard contact list (not shown) and separated by a contact group separator 428. The high priority contact list includes a plurality of contact objects 414. In some embodiments, each contact object 414 may be selectable. Upon selection of a contact object, a communication session may be initiated with the contact or an option to initiate one of a plurality of forms of communications may be presented to the user. In some embodiments, each selectable contact object may include a contact name object 422, a contact image object 424, and an additional information object 426. In some embodiments, the additional information object 426 may provide an indication that the contact uses the same communication service as the user. The contact information page 404*a* may also include a search object 416 that can be used to search the contact names 422, or other information associated with each contact. The plurality of contact objects 414 and contact group separator(s) 428 form a high priority contact list 420 that is scrollable. The high priority contact list 420 may be scrolled, for example (but not limited to), from top to bottom, bottom to top, right to left, or left to right. In some embodiments, the high priority contact list scrolls horizontally, and includes descriptive text beneath each high priority contact that describes a reason or the criteria matched (e.g., "Mom's Birthday").

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
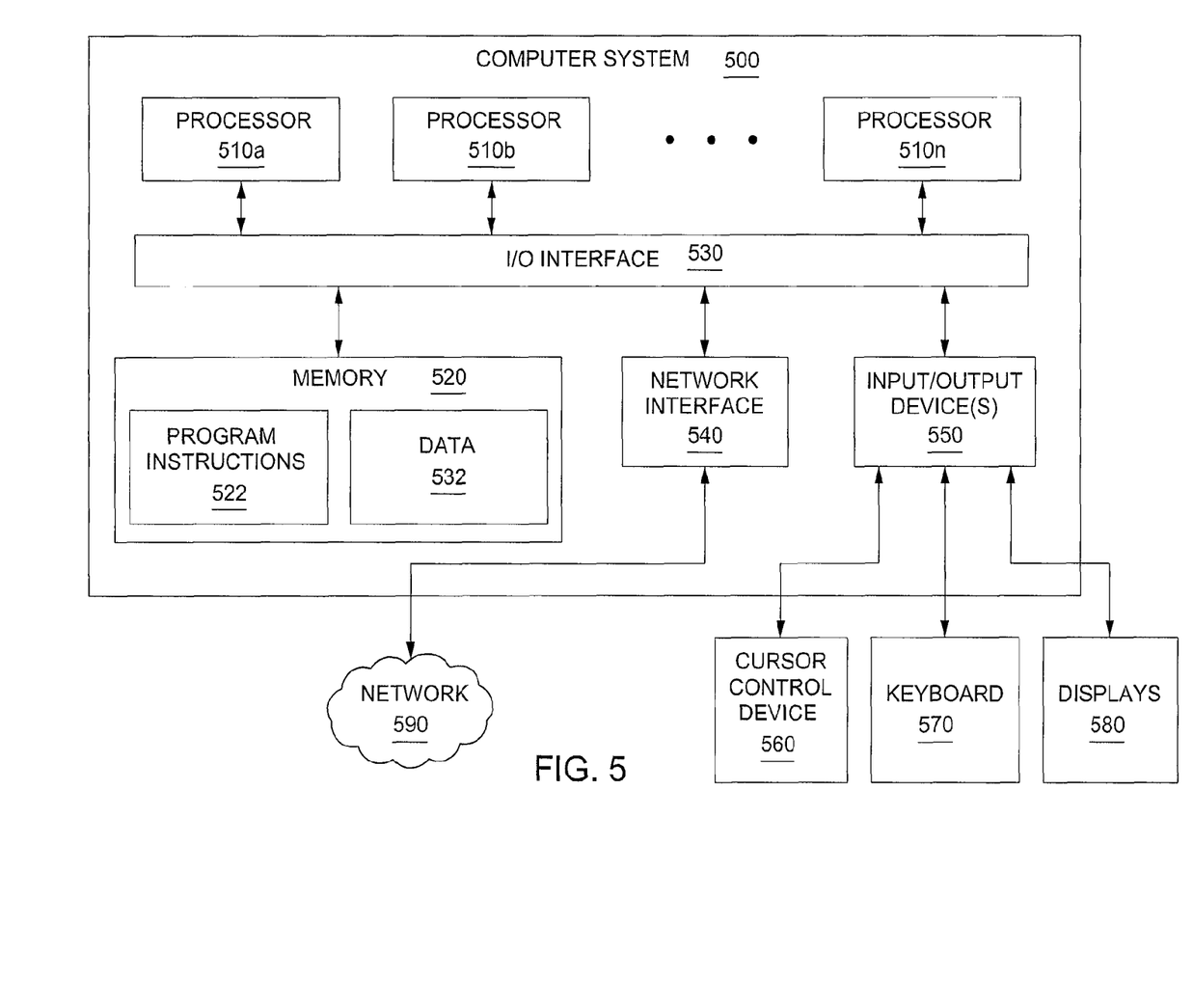
FIG. 5 is a detailed block diagram of a computer system, according to one or more embodiments.

FIG. 5 depicts a computer system 500 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 500 illustrated by FIG. 5, which may in various embodiments implement any of the elements or functionality illustrated in FIGS. 1-7. In various embodiments, computer system 500 may be configured to implement methods described above. The computer system 500 may be used to implement any other system, device, element, functionality or method of the above-described embodiments. In the illustrated embodiments, computer system 500 may be configured to implement method 300 as processor-executable executable program instructions 522 (e.g., program instructions executable by processor(s) 510) in various embodiments.

In the illustrated embodiment, computer system 500 includes one or more processors 510*a*-510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface (e.g., user interface 400) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for identifying and displaying a set of high priority contacts on a display device associated with an end user device, the method comprising:
   retrieving high priority contact list configuration settings that include one or more criteria for identifying a set of high priority contacts from a contact list having a plurality of contacts;
   determining whether information associated with one or more of the plurality of contacts meets the one or more criteria retrieved;
   identifying the one or more of the plurality of contacts that meet the one or more criteria as a set of one or more high priority contacts, wherein at least one contact is identified as a high priority contact based on criteria selected from the group consisting of a calling frequency, a calendar date, a calling pattern and a location; and
   displaying the set of one or more high priority contacts in a high priority contact list on the display device.

2. The computer-implemented method of claim 1, wherein at least one contact is identified as a high priority contact based on a calling frequency between the end user device and one or more devices associated with the contact that is greater than or equal to a predetermined calling frequency threshold.

3. The computer-implemented method of claim 1, wherein at least one contact is identified as a high priority contact based on a calendar date associated with the at least one contact.

4. The computer-implemented method of claim 3, wherein the calendar date associated with the at least one contact is included in contact information for the at least one contact on the end user device.

5. The computer-implemented method of claim 1, wherein at least one contact is identified as a high priority contact based on a calling pattern between the end user device and one or more devices associated with the contact.

6. The computer-implemented method of claim 5, wherein the calling pattern includes a configurable number of similar previous communications.

7. The computer-implemented method of claim 5, wherein the calling pattern includes at least one of specific times or specific days of communications between the end user device and one or more devices associated with the contact.

8. The computer-implemented method of claim 5, wherein the calling pattern includes a specific location from which communications between the end user device and one or more devices associated with the contact are initiated.

9. The computer-implemented method of claim 1, wherein at least one contact is identified as a high priority contact based on a location of at least one of the end user device or a device associated with the contact.

10. The computer-implemented method of claim 1, further comprising:
    receiving social network information associated with one or more one or more of the plurality of contacts,
    wherein at least one contact is identified as a high priority contact based on the social network information received.

11. The computer-implemented method of claim 1, further comprising:
    receiving calendar information associated with one or more one or more of the plurality of contacts,
    wherein at least one contact is identified as a high priority contact based on the calendar information received.

12. The computer-implemented method of claim 11, the calendar information received includes an upcoming scheduled call or meeting with the at least one contact.

13. The computer-implemented method of claim 1, wherein a number of entries in the high priority contact list is configurable.

14. The computer-implemented method of claim 1, wherein the high priority contact list is dynamically updated based on at least one of (a) calling activity, (b) a change to contact information associated with at least one of the plurality of contacts, (c) addition of a contact to the contact list, (d) removal of a contact to the contact list, (e) time, or (f) geolocation of the end user device or contacts from the contact list.

15. The computer-implemented method of claim 1, further comprising:
    requesting user feedback for each high priority contact identified to determine if the user wants the contact displayed in the high priority contact list; and
    receiving the user feedback requested for each high priority contact identified.

16. The computer-implemented method of claim 1, wherein displaying the set of one or more high priority contacts in a high priority contact list on the display device includes displaying, for each contact, a contact name and a description as to why the contact was identified as a high priority contact.

17. An apparatus for identifying and displaying a set of high priority contacts on a display device associated with an end user device, comprising:
    a) at least one processor;
    b) at least one input device; and
    c) at least one storage device storing processor-executable instructions which, when executed by the at least one processor, perform a method including
       (1) retrieving high priority contact list configuration settings that include one or more criteria for identifying a set of high priority contacts from a contact list having a plurality of contacts;
       (2) determining whether information associated with one or more of the plurality of contacts meets the one or more criteria retrieved;
       (3) identifying the one or more of the plurality of contacts that meet the one or more criteria as a set of one or more high priority contacts, wherein at least one contact is identified as a high priority contact based on criteria selected from the group consisting of a calling frequency, a calendar date, a calling pattern and a location; and (4) displaying the set of one or more high priority contacts in a high priority contact list on the display device.

18. A non-transitory computer readable medium for storing computer instructions that, when executed by at least one processor causes the at least one processor to perform a method for displaying and accessing contacts in a contact list on a display device, comprising:

retrieving high priority contact list configuration settings that include one or more criteria for identifying a set of high priority contacts from a contact list having a plurality of contacts;

determining whether information associated with one or more of the plurality of contacts meets the one or more criteria retrieved;

identifying the one or more of the plurality of contacts that meet the one or more criteria as a set of one or more high priority contacts, wherein at least one contact is identified as a high priority contact based on criteria selected from the group consisting of a calling frequency, a calendar date, a calling pattern and a location; and displaying the set of one or more high priority contacts in a high priority contact list on the display device.

19. A computer-implemented method for identifying and displaying a set of high priority contacts on a display device associated with an end user device, the method comprising:

retrieving high priority contact list configuration settings that include one or more criteria for identifying a set of high priority contacts from a contact list having a plurality of contacts;

determining whether information associated with one or more of the plurality of contacts meets the one or more criteria retrieved;

receiving one of social network information or calendar information associated with one or more of the plurality of contacts;

identifying the one or more of the plurality of contacts that meet the one or more criteria as a set of one or more high priority contacts, wherein at least one contact is identified as a high priority contact based on the social network information or calendar information; and displaying the set of one or more high priority contacts in a high priority contact list on the display device.

* * * * *